B. AMON.
PORTABLE SAWING MACHINE.
APPLICATION FILED SEPT. 11, 1917.
1,294,368.
Patented Feb. 18, 1919.
2 SHEETS—SHEET 1.
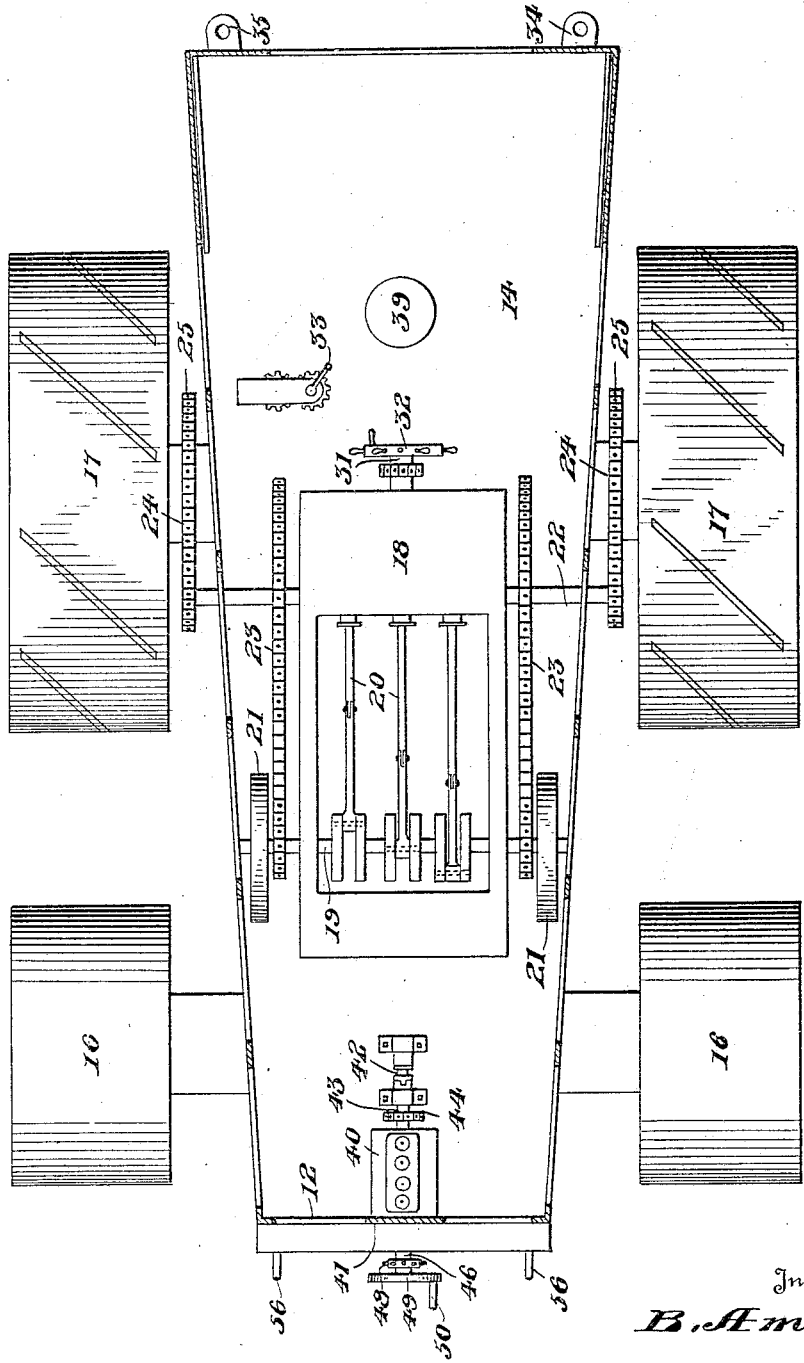
Inventor
B. Amon
By N. M. Wilson
Attorney

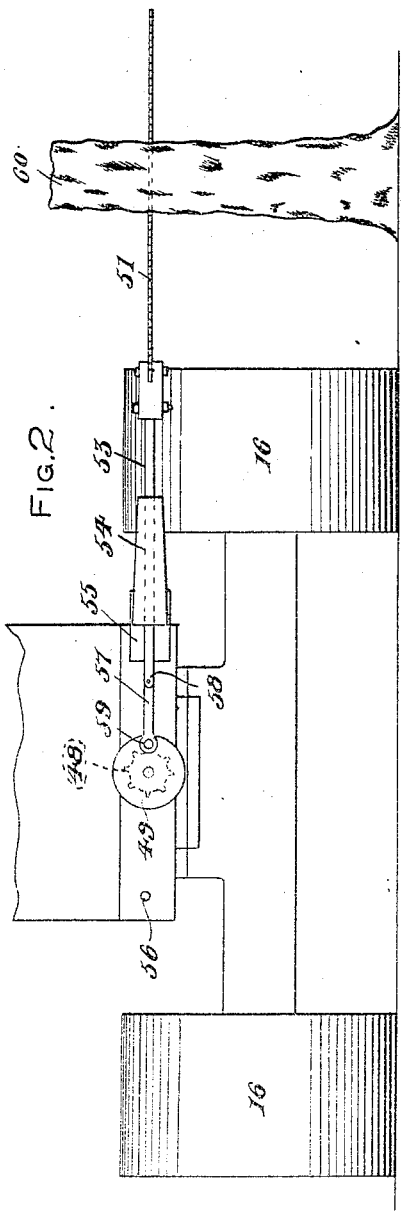
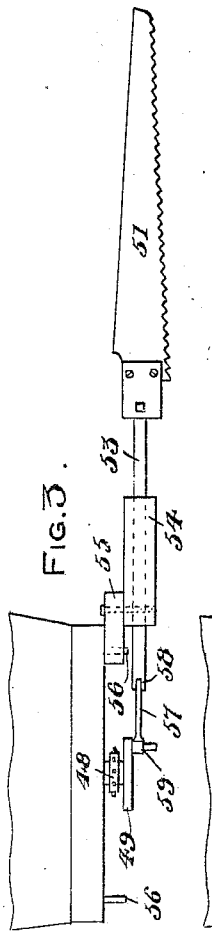
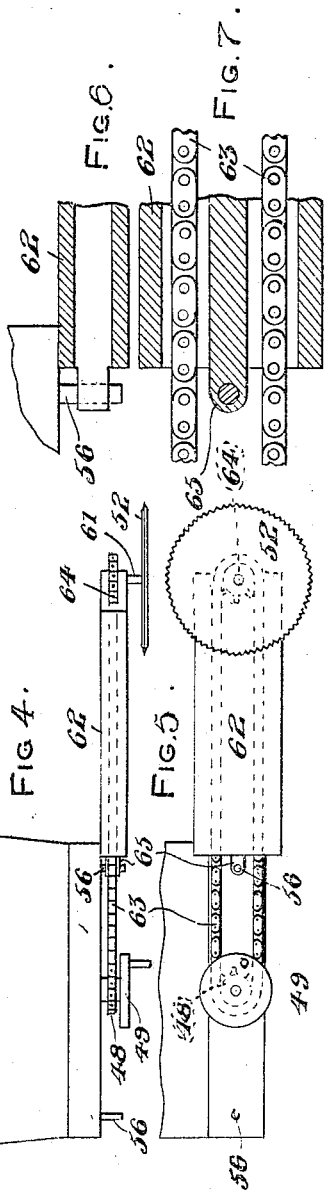

UNITED STATES PATENT OFFICE.

BLAS AMON, OF EAST PITTSBURGH, PENNSYLVANIA.

PORTABLE SAWING-MACHINE.

1,294,368.        Specification of Letters Patent.        Patented Feb. 18, 1919.

Application filed September 11, 1917. Serial No. 190,780.

*To all whom it may concern:*

Be it known that I, BLAS AMON, a subject of the Emperor of Austria, residing at East Pittsburgh, in the county of Allegheny and State of Pennsylvania, have invented certain new and useful Improvements in Portable Sawing-Machines, of which the following is a specification.

An object of the device is the provision of a tractor arranged with a motor driven mechanism adapted for operating a saw either of the reciprocating or rotary type whereby trees may be readily felled wherever desired.

A further object of the invention is the provision of an attachment for motor vehicles, such as tractors, arranged for operating a saw at a point adjacent the vehicle.

In the drawings forming a part of this application and in which like designating characters refer to corresponding parts throughout the several views, Figure 1 is a horizontal sectional view of my improved portable sawing machine.

Fig. 2 is a front elevation of the same partly broken away and illustrating the saw mechanism operatively arranged thereon and in its sawing position.

Fig. 3 is a top plan view thereof.

Figs. 4 and 5 are similar views of a rotary form of saw attachment, and

Figs. 6 and 7 are sectional views thereof.

Referring more in detail to the drawing, a vehicle 10 is provided having a body or cab 11 furnished with suitable windows 12, a door 13, a floor 14 and a roof 15 while forwardly positioned steering wheels 16 and rear traction wheels 17 are provided for the vehicle.

A driving engine 18 is arranged within the cab 11 having a driving shaft 19 operated by pistons 20 and arranged with fly-wheels 21. A driven shaft 22 is provided for the engine operatively connected by means of sprocket chains 23 with the driving shaft 19 and operatively connected by means of sprocket chains 24 with gears 25 attached to the traction wheels 17. It will be understood that, in operation, the engine 18 imparts a rotary movement to the rear wheels 17 of the tractor to move the latter either forwardly or rearwardly.

A segmental rack 26 is operatively connected by a bracket 27 with the forward wheels 16 and is engaged by a pinion 28 upon a stub shaft 29, which stub shaft is connected by means of a sprocket chain 30 with a steering axle 31 arranged within the cab 11 and having a hand wheel 32. The operator of the device being positioned rearwardly of the engine 18 within the cab may direct the movement of the structure through the agency of the wheel 32. A suitable brake, not shown, may be provided operable by means of a hand crank 33 arranged adjacent to the steering wheel 32.

Draft beams 34 are arranged beneath the cab 11 having free rear end portions 35 adapted for connection with members such as wagons or plows which it is desired to attach behind the structure to be drawn forwardly thereby. A seat 39 for the operator may be positioned adjacent to the wheel 32.

For rendering the device readily serviceable in cutting trees and other sawing portions, an explosive motor 40 is arranged within the cab 11 adjacent the forward end 41 thereof, the said motor being provided with a suitable starting clutch mechanism 42 and having a driving shaft 43 operatively connected by means of a sprocket chain 44 with a sprocket wheel 45 arranged upon a driven shaft 46 positioned beneath the motor within a housing 47. A sprocket wheel 48 is arranged upon the shaft 46 forwardly of the housing 47 while a driving disk 49 having a crank pin 50 is also arranged upon the said shaft 46.

A saw attachment is provided for a reciprocating saw 51 as shown in Figs. 3 and 4 or a rotary saw 52 as shown in Figs. 5 and 6, the same being detachably carried by the housing 47 and operatively connected to the shaft 46. A saw 51 is provided with a handle 53 longitudinally slidable through a sleeve 54 provided with a block 55 adapted for detachable pivotal mounting upon either of the pins 56 arranged adjacent the opposite sides of the housing 47. A pitman 57 is pivotally connected as at 58 to the free rear end of the handle 53 and is adapted for detachable pivotal connection at its rear end 59 with the crank pin 50 of the disk 49. It will be understood that when it is desired to saw down a tree such as 60, the block 55 is mounted upon one of the pins 56 and the pitman 57 is connected to the crank pin 50 so that the operation of the motor 40 reciprocates the saw 51 during the sawing operation and the operator may direct its movements by grasping the sleeve 54, the saw being slightly shiftable from its normal horizontal plane by reason of the pivotal connection of the block 55 with its mounting pin 56.

The rotary saw 52 is arranged with a shaft 61 pivoted at the forward end of a casing 62 and having a sprocket chain 63 extending through the latter and passing over a sprocket wheel 64 upon the shaft 61. A mounting arm 65 is carried by the casing 62 at the end thereof opposite to the shaft 61 for pivotal mounting upon one of the aforementioned pins 56. When it is desired to employ the rotary saw 52 the sprocket chain 63 is arranged upon the sprocket wheel 48 and the arm 65 being positioned upon one of the pins 56, the operation of the motor 40 operatively drives the saw 52. The operator may vertically adjust the saw 52 by grasping the casing 62 and also thereby assist in supporting the casing and saw during the operation of the latter.

A serviceable device is arranged the movements of which may be readily controlled by one or more operators while the saw mechanisms may be employed for cutting trees and other objects adjacent to which the structure may be directed to travel. The device possesses great strength and it will be seen that a row of trees or other upstanding objects such as posts may be quickly cut down by driving the tractor in a path of travel adjacent thereto while the forward movement of the tractor may also be utilized during the cutting operation for the advancement of the saw through the work being operated upon. While the form of the different portions of the device herein illustrated and described are believed to be the preferable embodiment thereof, it will be understood that minor changes may be made in the same if found desirable.

What I claim as new is:—

In combination with a support and means to move the same forwardly, a horizontal forwardly extending driving shaft carried by the support, a horizontal mounting pin extending forwardly from the support and parallel with said shaft, a saw-carrying frame having a member provided with a transverse aperture to receive said pin and thereby detachably and pivotally mount said frame on said pin, and means associated with said shaft to actuate the saw of said frame.

In testimony whereof I affix my signature.

BLAS AMON.